UNITED STATES PATENT OFFICE.

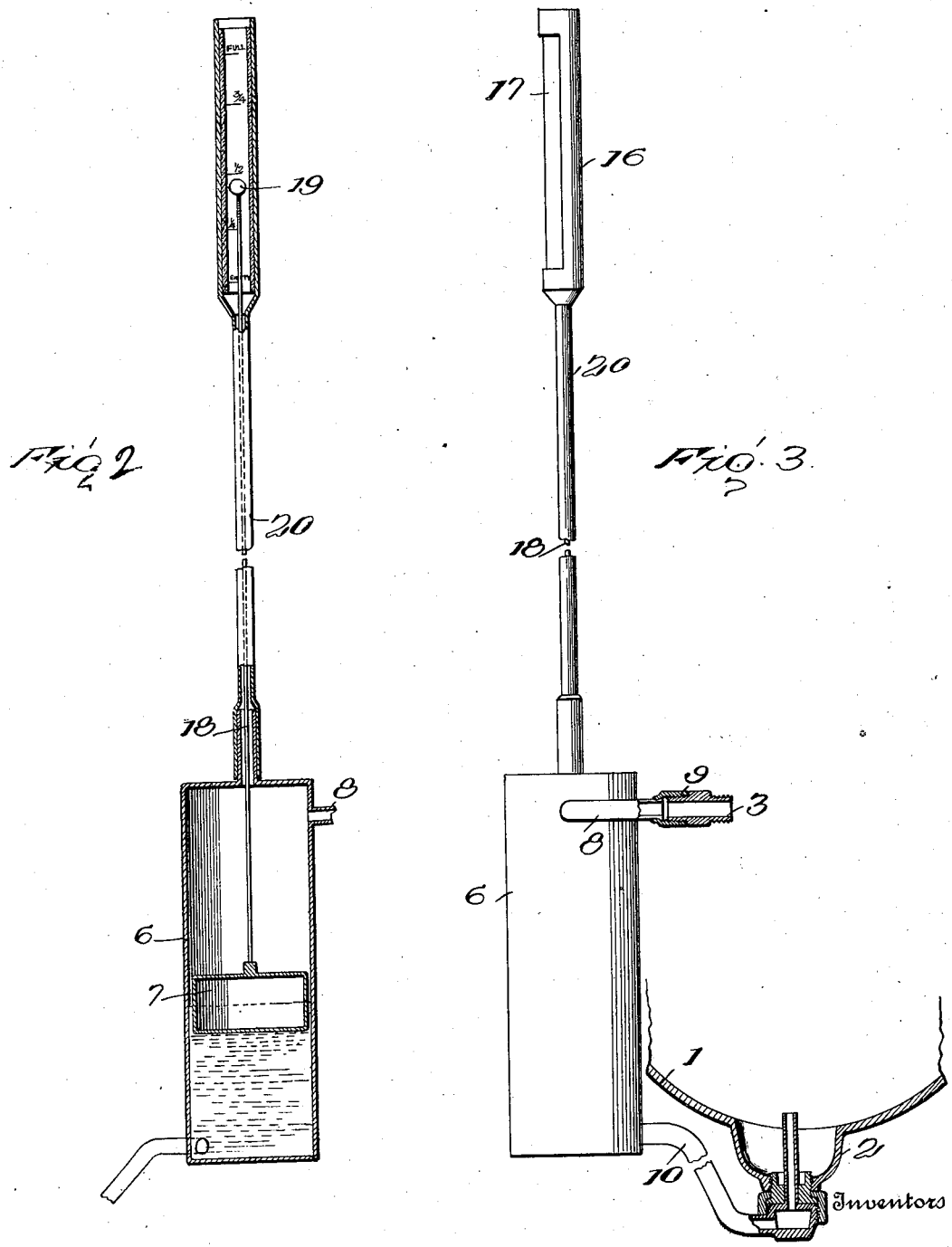

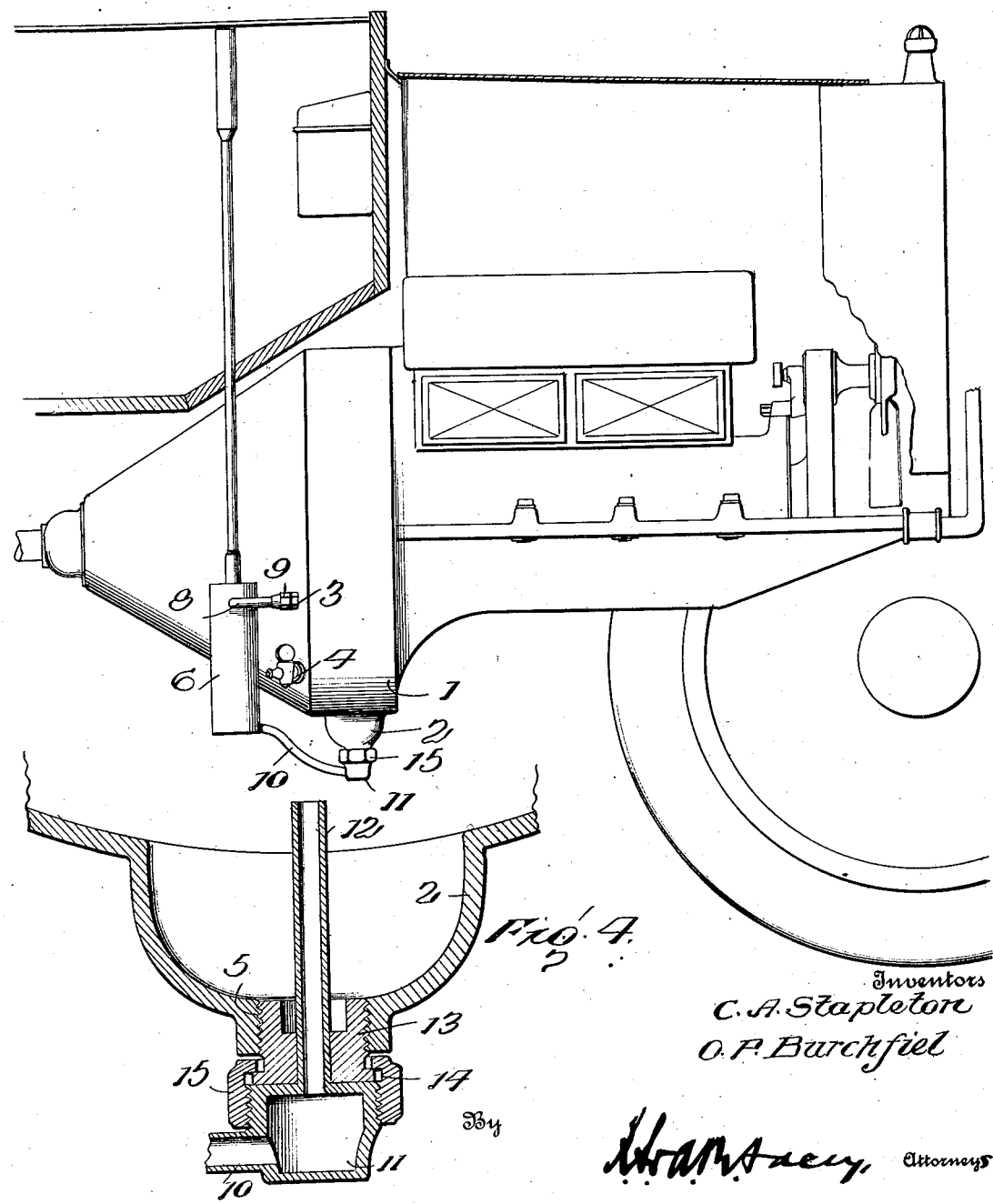

CHARLES A. STAPLETON AND OTHA P. BURCHFIEL, OF ANTHONY, KANSAS.

OIL-GAGE.

1,216,744.
Specification of Letters Patent.
Patented Feb. 20, 1917.

Application filed June 29, 1915. Serial No. 37,093.

*To all whom it may concern:*

Be it known that we, CHARLES A. STAPLETON and OTHA P. BURCHFIEL, citizens of the United States, residing at Anthony, in the county of Harper and State of Kansas, have invented certain new and useful Improvements in Oil-Gages, of which the following is a specification.

Internal combustion engines lubricated by means of the splash system embody an oil tight case for inclosing the crank shaft and adjunctive parts, such case being supplied with the oil by means of which the engine is lubricated. The best results are obtained by maintaining a nearly uniform level after the same has been determined. An oversupply of oil results in waste and rapid fouling of the spark plugs, valves and engine by a deposition of carbon on such parts. An insufficient supply of oil produces overheating of the parts and bearings and is frequently the cause of injury to the Babbitt bearings of the connecting rods and cam and crank shafts.

The present invention provides a gage whereby the level of the oil in the crank case is indicated at all times whether the engine is at rest or running so that the predetermined level of the oil may be maintained by proper supply of oil at frequent intervals.

The invention provides means embodying an indicator and a float, the latter being disposed so as to be actuated by the change of level of oil in the crank case and the indicator being connected with the float and arranged in convenient position so as to be under observation at all times.

The invention also has for its object the provision of an oil gage which may be readily fitted to motor vehicles in use without requiring any change or special adaptation in the installation thereof.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—

Figure 1 is a detail view of the forward part of a motor vehicle provided with an oil gage embodying the invention;

Fig. 2 is a sectional view of the oil gage;

Fig. 3 is a view in elevation of the oil gage showing part of the crank case and the connections for coupling the oil gage to the crank case, such connections being in section;

Fig. 4 is an enlarged section of the lower portion of the crank case showing the connection of the oil gage therewith.

Corresponding and like parts are referred to in the following description and indicated in all the views of the drawings by the same reference characters.

In Fig. 1 is illustrated part of a motor vehicle of well known construction, the same embodying an engine having a crank case formed with an enlarged portion 1 which is provided at its lowest point with a sump or dreg basin 2. The part 1 of the crank case is provided with upper and lower outlets to which are usually fitted petcocks which are utilized to determine the level of the oil in the crank case. The sump or dreg basin 2 is provided at its lowest point with an internally threaded opening 5 which is usually closed by means of a plug but which plug is removed to admit of the lowest portion of the oil gage being coupled to the part 2 by means of the threaded opening 5. As illustrated most clearly in Fig. 1 the upper petcock which is usually coupled to the outlet 3 is removed to admit of the upper portion of the float chamber of the oil gage being coupled thereto.

The oil gage comprises indicating means and a float mechanism. The indicator is disposed in convenient position so as to be under observation at all times. The float mechanism is located adjacent the lower portion of the crank case and is connected thereto substantially as illustrated in Figs. 1 and 3. The float mechanism comprises a float chamber 6 and a float 7 located within the chamber 6 and adapted to move freely therein. The float 7 may be of any construction and usually consists of a hollow case of sufficient lightness to float upon the surface of the oil and move therewith as the level of the oil changes. The float chamber 6 may be of any construction and capacity and usually consists of a closed cylinder. A tube 8 is connected to a side of the float chamber near the upper end thereof and is coupled to the outlet 3 by means of a coupling 9 of any approved construction. A tube 10 is connected to the lower portion of the float chamber 6 and is adapted to be coupled to the opening 5 of the sump or dreg chamber 2 in the manner presently to be described. The float chamber is disposed so that the proper level of the oil in the crank case comes between the upper and lower ends of the float chamber. By reason of the position and the manner of coupling the float chamber to the crank case, the level of the oil in the float chamber will coincide with the level of the oil in the crank case. The exact level of the oil is shown by the indicator through the instrumentality of the float 7 in a manner to be set forth hereinafter. A hollow head 11 is connected to the outer end of the tube 10 and is externally threaded and is provided with a vertically extending stand pipe 12 which projects through the sump or dreg chamber and terminates a short distance above such sump so as to clear the oil and residue accumulated in the sump or dreg chamber. A plug 13 having an outer flange 14 at its lower end and formed with a central opening to receive the stand pipe 12 is threaded into the opening 5 and replaces the ordinary plug which is removed. A union 15 engages the flange 14 of the plug 13 and is threaded to the hollow head 11 and connects the same to the plug. It will thus be understood that the tube 10 may be readily coupled to the drain opening 5 of the sump or dreg chamber 2 without requiring any change in the construction thereof, it being necessary only to remove the usual plug and replace the same by means of the plug 13. In this connection it is to be understood that the hollow head 11 with the stand pipe 12 may be coupled to the part 2 in any manner.

The indicator consists of a tube 16 having the major portion of a side thereof cut away and fitted with a transparent protector 17 of glass, mica or other transparent material. The inner wall of the tube 16 opposite the cut away portion is provided with a suitable gage, which is of a nature to be easily read. A connection 18, such as a wire, is coupled at its lower end to the float 7 and is provided at its upper end with a pointer 19 which may be of any form, the same being disposed to operate in the tube 16 over the scale provided therein. The tube 16 is disposed within the vehicle so as to be out of the way and under observation at all times so that the position of the pointer 19 may be observed and the level of the oil in the crank case ascertained. It is to be understood that there is a definite relationship between the indicator and the float devices so that the level of the oil in the crank case may be correctly designated by the indicator. When the level of the oil in the crank case rises the pointer 19 will move upward in the tube 16 and when the level of the oil lowers in the crank case the pointer 19 will correspondingly descend in the tube 16 and on reference to the scale the exact level of the oil may be ascertained. A sheath 20 protects the connection 18 and also forms connecting means between the tube 16 and the float chamber 6. The sheath may consist of a pipe or tube and is of a size so as not to interfere with the free movements of the connection 18.

When the improved oil gage is properly installed the exact level of the oil in the crank case is indicated at all times, thereby enabling oil to be properly supplied at frequent intervals to maintain a practically uniform level of oil within the crank case and thereby secure economy in the consumption of oil while at the same time prevent the carbonizing of the engine or the overheating of the bearings.

Having thus described the invention, what is claimed as new is:—

1. The combination with a vessel containing a lubricant and including a dreg chamber, of a float chamber adapted to be connected to the dreg chamber and to the vessel above the lubricant therein and affording fluid communication between the interior of the float chamber and the vessel, and a stand pipe continuing the dreg chamber connection and projecting into the vessel above the dreg chamber.

2. In combination with a vessel containing a lubricant, of a float chamber, means connecting the upper portion of the float chamber with the vessel at a point above the predetermined level of the lubricant therein, other means connecting the lower portion of the float chamber with the lowest point of the vessel and embodying a straight stand pipe projecting upward into the vessel to a point above the level of the usual accumulation of residue, a float disposed in the float chamber and movable therein by the change of level of the lubricant in the vessel, and an indicator disposed to be under observation at all times and having connection with the said float to be actuated thereby.

3. Means for designating the level of oil in a vessel containing a lubricant comprising a float chamber, connecting means between the upper portion of the float chamber and the vessel, a tube connected with the lower portion of the float chamber, a hollow head in the length of the tube and provided with a stand pipe projecting through the lower portion of the vessel and extending upward therein for a short distance, coupling means for connecting the hollow head to the vessel, a float disposed within the float chamber, and an indicator connected with the float and adapted to be actuated thereby.

4. The combination with a liquid receiving vessel, of a float chamber having fluid communication therewith and extending above the normal level of the liquid within the vessel, and a stand pipe projecting through the plane of the bottom wall of the vessel and having fluid communication with the lower extremity of said float chamber with the free end of said pipe presented upwardly within the vessel.

In testimony whereof we affix our signatures in presence of two witnesses.

CHARLES A. STAPLETON. [L. S.]
OTHA P. BURCHFIEL. [L. S.]